P. EDGERTON.
Churn Dasher.
No. 104,127.
Patented June 14, 1870.
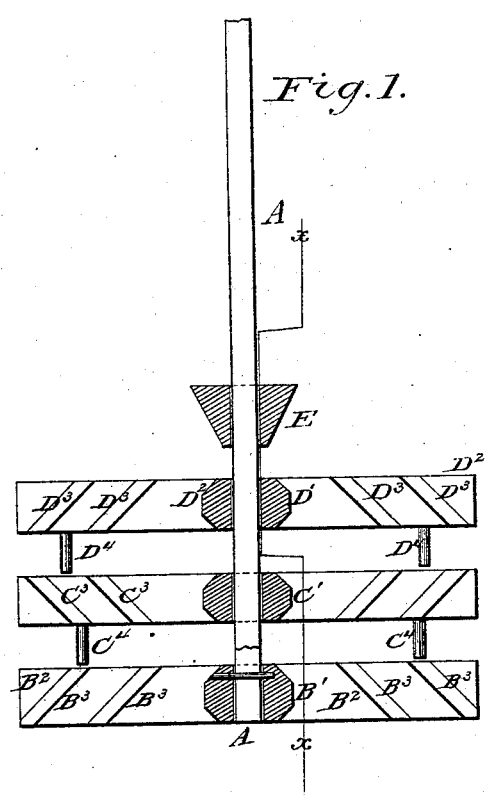
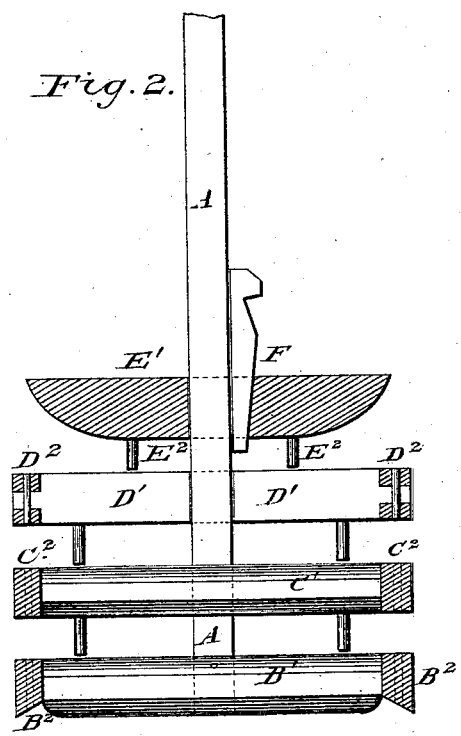

United States Patent Office.

PHILIP EDGERTON, OF RUTLAND, VERMONT.

Letters Patent No. 104,127, dated June 14, 1870.

IMPROVEMENT IN CHURN-DASHER.

The Schedule referred to in these Letters Patent and making part of the same.

*To all whom it may concern:*

Be it known that I, PHILIP EDGERTON, of Rutland, in the county of Rutland and State of Vermont, have invented a new and useful Improvement in Churn-Dashers; and I do hereby declare that the following is a full, clear, and exact description thereof, which will enable others skilled in the art to make and use the same, reference being had to the accompanying drawing forming part of this specification, in which—

Figure 1 is a detail vertical cross-section of my improved churn-dasher.

Figure 2 is a detail section of the same, taken through the line $x\,x$, fig. 1.

Similar letters of reference indicate corresponding parts.

My invention has for its object to furnish an improved churn-dasher, which shall be so constructed and arranged as to throw the milk into various currents and counter-currents, thereby violently agitating it, bringing the butter in a very short time, and developing all the butter that may be in the milk; and It consists in the construction and combination of the various parts of the dasher, as hereinafter more fully described.

A is the dasher-handle, to the lower end of which is attached a cross-bar, $B^1$, having its side edges beveled off, as shown in figs. 1 and 2, and having cross-bars $B^2$ attached to its ends.

$B^3$ are bars or slats set in inclined positions, as shown in fig. 1, and the ends of which are secured to the bars $B^2$.

The lower edges of the bars $B^2$ are beveled off, as shown in fig. 2, so that, as the dasher is forced downward through the milk, the parts of the said milk that are nearest to the sides of the churn may be forced inward, so that all the milk may be thoroughly intermingled, and, consequently, equally operated upon.

$C^1\,C^2\,C^3$ is a section of the dasher, similar to the section $B^1\,B^2\,B^3$, except that the slats $C^3$ are inclined in exactly the opposite direction from the inclination of the slats $B^3$, as shown in fig. 1.

The section $C^1\,C^2\,C^3$ is placed upon the dasher-handle A, and is kept from coming in contact with the section $B^1\,B^2\,B^3$ by the pins $C^4$, attached to the section $C^1\,C^2\,C^3$ in such positions that their lower ends may rest upon the section $B^1\,B^2\,B^3$, as shown in the drawing.

$D^1\,D^2\,D^3$ is a section made exactly like the section $C^1\,C^2\,C^3$, except that the slats $D^3$ are inclined in the opposite direction from the inclination of the slats $C^3$; that is to say, in the same direction as the slats $B^3$ of the lowest section.

The section $D^1\,D^2\,D^3$ is supported above the section $C^1\,C^2\,C^3$ by pins $D^4$, as shown in figs. 1 and 2.

$E^1$ is a cross-bar, the lower edges of the sides and ends of which are beveled off, as shown in figs. 1 and 2, and which is supported above the upper section $D^1\,D^2\,D^3$ by pins $E^2$, in the same manner as the said sections are supported above each other.

The hole or slot through the bar $E^1$ is made longer than the breadth of the dasher-handle A that passes through it, and one of its ends is made inclined, as shown in fig. 2, to receive the wedge-key F, by means of which the various loose parts of the dasher are securely held in place, and the withdrawal of which allows the upper sections to be readily detached, for convenience in washing the dasher.

By this construction of the dasher the different inclinations of the slats of the different sections throw the milk alternately toward and from the center of the churn, thus throwing it into various currents and counter-currents, and bringing the butter in a very short time, the guard-bar E preventing the milk from spattering out through the churn-cover.

This dasher is more particularly designed for use in a square churn with vertical sides.

Having thus described my invention,

I claim as new and desire to secure by Letters Patent—

A churn-dasher, formed of sections $B^1\,B^2\,B^3$, $C^1\,C^2\,C^3$, $D^1\,D^2\,D^3$, held apart by intermediate pins $C^4\,D^4$, and all retained firmly in place by a bar, $E^1$, fastened above the highest section, and having pins $E^2$ bearing upon the said section, all as shown and described.

PHILIP EDGERTON.

Witnesses:
WM. M. ALVORD,
M. G. EVERTS.